United States Patent Office 2,722,538
Patented Nov. 1, 1955

2,722,538

MIXED ANHYDRIDES OF CARBOXYLIC ACIDS AND THE MONOESTERS OF MONOPHOSPHONIC ACIDS

Harold L. Jackson, Wilmington, Del., assignor to E. I. du Pont de Nemours and Company, Wilmington, Del., a corporation of Delaware No Drawing. Application August 1, 1951, Serial No. 239,855

12 Claims. (Cl. 260—461)

This invention relates to new organic phosphorus compounds and more specifically to the mixed anhydrides of carboxylic acids and monoesters of phosphonic acids, their preparation, and the use of such mixed anhydrides in the preparation of certain carboxylic acid derivatives.

The acylations of amino hydrogen containing amines and of alcohols with carboxylic acids and their various derivatives to form, respectively, the carboxamides and carboxylic acid esters have long been known. In recent years these acylation reactions have become quite important, particularly in two fields: (a) fundamental studies, involving mostly the carboxamide forming reaction, on the nature of the synthesis of the natural peptides, and (b) the formation of high molecular weight polyesters and polyamides, particularly the linear polymers from dicarboxylic acids and their derivatives with complementary ester and amide forming reactants. This latter reaction, stemming from the early work of Carothers on high molecular weight linear condensation polymers (see, for instance, U. S. 2,071,250, –1, and –3), has formed the basis for an important and large scale synthetic film and fiber industry.

In both of these fields there has long been felt a need for methods of carrying out the acylation reactions involved at appreciably lower temperatures. This is particularly true in the linear condensation polymer field because of the relatively high temperatures used in the present industrial preparation of these polyesters and polyamides. These temperatures, e. g., 225–300° C. for periods of from one to four hours or even longer, have made the preparation of polyesters and polyamides from intermediates containing extrafunctional substituents extremely difficult because of the undesirable side reactions encountered, e. g., cross-linking. The use of complementary polyester and polyamide forming reactants containing such extrafunctionalities as ketone, ether, disulfide, or like groups might be extremely desirable because of possible improved properties of the products therefrom, e. g., improved dyeability, greater ease of handling and modification, and the like. One solution to this problem has recently been uncovered by the discovery of the acylphosphoric acid diesters, particularly those of the dibasic carboxylic acids as described in greater detail in the application of Kirby Ser. No. 224,850, filed May 5, 1951, now Patent #2,625,536. However, additional routes to the preparation of any commercial product are desirable and even at times, essential. This is particularly the case when, by reason of shortages, allocations, or the like, a material may be in short supply.

This invention has as an object a new class of phosphorus containing organic compounds. Another object is the provision of a new class of acylating agents. An additional object is the provision of a new route to carboxamides and carboxylic esters. A further object is the provision of a new route to polymers, particularly linear polymers. Other objects will appear hereinafter.

These objects are accomplished through the invention of the mixed anhydrides of carboxylic acids and the monoesters of monophosphonic acids. These new derivatives have the general formula

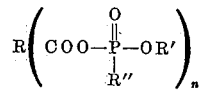

where $n$ is an integer, where R, R', and R'' are organic radicals free from active (Zerewitinoff) hydrogen and the R's and R''s in the case where $n$ is plural need not be the same. The new derivatives when the acid is a monocarboxylic acid have the structure

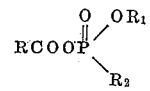

wherein R, $R_1$, and $R_2$ are organic radicals, alike or different, free of Zerewitinoff-active hydrogens. The mixed anhydride of a dicarboxylic acid with monoesters of monophosphonic acids has the formula

wherein R, $R_1$, and $R_2$ are as above and $R_3$ and $R_4$ are similarly organic radicals, alike or different, free of Zerewitinoff-active hydrogens. While, in the general formula given above $n$ may be 3 as in the derivatives from tricarballylic or trimesic acid or 4 as in the derivatives from pyromellitic acid the utility of the compounds of this invention where $n$ is greater than 2 is by no means as great as is the utility of the compounds where $n$ is 1 or 2.

Because of their greater ease of preparation and greater efficiency in the amide and ester forming reaction the mixed anhydrides of carboxylic acids and monophosphonic acid monoesters which, other than, respectively, the carboxyl group and the phosphonic acid group, are solely hydrocarbon are preferred, i. e., compounds of the above-given general structures wherein the various R's are solely hydrocarbon radicals. This increased ease in preparation becomes particularly apparent with the mixed anhydrides of carboxylic acids and monophosphonic acid monoesters which, other than the carboxyl and phosphonic acid groups are aliphatically saturated hydrocarbon, i. e., compounds of the above-given formula wherein the various R's are hydrocarbon radicals free of aliphatic unsaturation.

The following examples in which parts are by weight are illustrative of the invention.

EXAMPLE I

A. *Preparation of the mono-n-butyl ester of benzene-phosphonous acid*

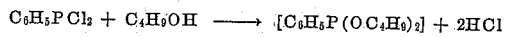
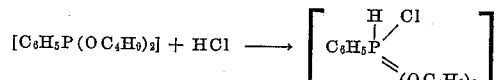
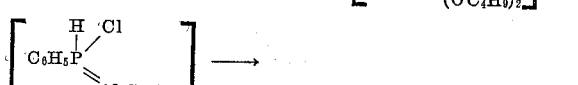
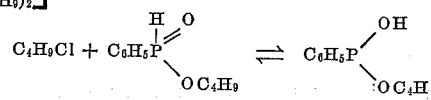

To 188 parts of n-butanol in a reactor cooled in an ice-water bath is added dropwise with vigorous mechanical stirring and under anhydrous conditions 160 parts of phenyl dichlorophosphine at such a rate that the temperature of the reaction mixture remains below 12° C. After the addition is completed stirring is continued and the reactor evacuated at the water pump for three hours at room temperature. The resulting clear colorless liquid is distilled through a six-inch Vigreux column under a pressure corresponding to 0.3 mm. of mercury and the fraction boiling over the range 105–124° C. collected. The 142 parts of crude product thus obtained is then redistilled through a precision fractionating column and the fraction boiling at 90.5–92.0° C. under a pressure corresponding to 0.12 mm. of mercury collected. There is thus obtained 45 parts of pure mono-n-butyl benzenephosphonite exhibiting $n_D^{25}=1.5081$.

*Analysis.*—Calculated for $C_{10}H_{15}PO_2$: C, 60.60%; H, 7.63%; P, 15.65%. Found: C, 60.51%, 60.59%; H, 7.68%, 7.82%; P, 15.30%, 15.46%.

B. Preparation of the mono-n-butyl ester of benzenephosphonic acid monochloride

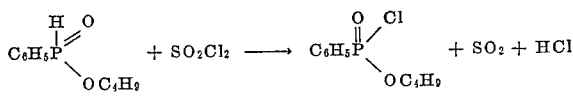

A solution of 39.64 parts of mono-n-butyl benzenephosphonite in about 240 parts of carbon tetrachloride is cooled in an ice-water bath and a solution of 28 parts (an equimolar proportion based on the phosphonite) of sulfuryl chloride in about 50 parts of carbon tetrachloride is added under anhydrous conditions at such a rate that the temperature of the reaction mixture remains below about 20° C. After the addition is completed the ice-water bath is removed and the mixture allowed to come to room temperature. Dry nitrogen is then bubbled into the clear solution for three hours exhausting to the atmosphere to remove the hydrogen chloride and sulfur dioxide formed in the reaction. The carbon tetrachloride solvent is then removed from the reaction mixture by distillation under reduced pressure and the clear residue remaining distilled under reduced pressure through a Vigreux column. The fraction boiling at 116.0–117.5° C. under a pressure corresponding to 0.75–0.80 mm. of mercury is taken as pure mono-n-butyl ester of benzenephosphonic acid monochloride. This pure compound exhibits a refractive index $n_D^{25}=1.5105$.

*Analysis.*—Calculated for $C_{10}H_{14}PO_2Cl$: Cl, 15.23%. Found: Cl, 15.29%.

C. Preparation of the mono-n-butyl ester of benzenephosphonic acid

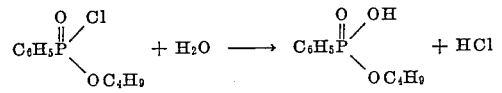

A mixture of 18.18 parts of the mono-n-butyl ester of benzenephosphonic acid monochloride in 100 parts of distilled water is stirred rapidly at room temperature for two hours. It is then heated to steam bath temperature for one hour with stirring and finally allowed to cool to room temperature overnight with continued stirring. The resulting clear solution is extracted with three (about 45 part) portions of chloroform. The combined chloroform extracts are dried over anhydrous calcium sulfate and the chloroform removed from the dried extracts by distillation under reduced pressure. There is thus obtained 13.39 parts of mono-n-butyl benzenephosphonic acid as a clear, colorless liquid exhibiting a refractive index $n_D^{25}=1.5092$.

*Analysis.*—Calculated for $C_{10}H_{15}PO_3$: C, 56.07%; H, 7.06%; P, 14.44%; N. E. (neutral equivalent), 214.2. Found (average); C, 56.16%; H, 7.20%; P, 14.38%; N. E., 209.4.

The product undergoes decomposition when attempts are made to distill it, even under a reduced pressure corresponding to 0.6 mm. of mercury.

D. Preparation of adipyl-bis(n-butyl benzenephosphonate)

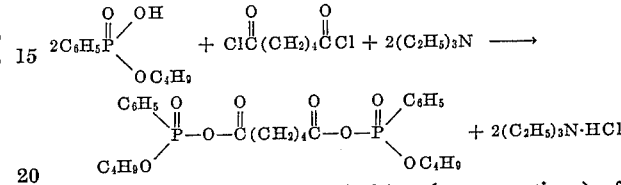

A solution of 11.39 parts (2.04 molar proportions) of mono-n-butyl benzenephosphonic acid, 4.84 parts (1 molar proportion) of freshly distilled adipyl chloride in about 140 parts of anhydrous diethyl ether is stirred rapidly and cooled to 2° C. To this well-stirred solution is added dropwise a solution of 5.5 parts (2.17 molar proportions) of triethylamine in about 18 parts of anhydrous diethyl ether at such a rate that the temperature of the reaction mixture remains below 5° C. At the end of the addition the reaction mixture is stirred at ice-bath temperature for two hours and then for three more hours at room temperature. The white precipitate of triethylamine hydrochloride which forms during the addition is removed by filtration through diatomaceous silica and the solvent removed from the clear filtrate by distillation under reduced pressure. There is thus obtained an essentially quantitative yield of adipyl-bis(mono-n-butyl benzenephosphonate) as a clear liquid residue exhibiting a negative test for chlorine when treated with alcoholic silver nitrate solution and reacting readily with hydroxylamine to form the corresponding hydroxamic acid giving the characteristic color test with ferric chloride; see Lipmann and Tuttle (J. Biol. Chem. 159, 21–8 (1945)).

*Analysis.*—Calculated for $C_{26}H_{36}P_2O_8$: C, 57.98%; H, 6.74%; P, 11.51%. Found (average): C, 58.36%; H, 7.00%; P, 11.04%.

The product is further characterized as adipyl-bis (mono-n-butyl benzenephosphonate) through the formation of N,N'-diphenyladipamide by treatment of a chloroform solution of aniline with the adipyl-bis(mono-n-butyl benzenephosphonate). The N,N'-diphenyladipamide thus obtained as a white, crystalline precipitate, after removal by filtration and recrystallization from 2B alcohol, melts at 240–241° C. (Hill, J. Am. Chem. Soc. 52, 4110 (1930) reports the same melting point. Furthermore, the N,N'-diphenyladipamide thus obtained did not lower the melting point as judged by the mixed melting point of an authentic sample of adipic acid dianilide.

*Analysis.*—Calculated for $C_{18}H_{20}N_2O_2$: N, 9.45%. Found: N, 9.39%.

EXAMPLE II

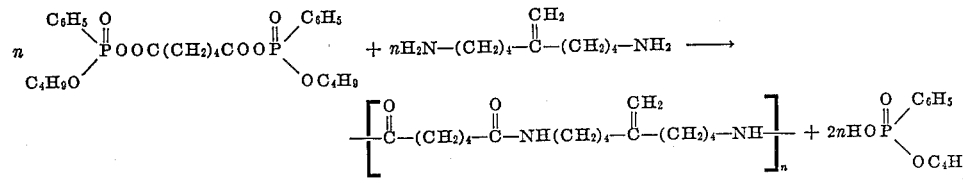

To 2.70 parts of the mixed anhydride of adipic acid and the mono-n-butyl ester of benzenephosphonic acid is added a solution of 0.84 part (an equimolar proportion based on the anhydride) of 5-methylene-1,9-nonanediamine in about 50 parts of 10% aqueous sodium carbonate solution and the mixture vigorously shaken at once. An exothermic reaction occurs in the heterogeneous dispersion with the precipitation of a slightly yellow solid. The mixture is shaken mechanically for five hours at room temperature and the slightly colored precipitate formed during the reaction period removed by filtration, washed with distilled water, and finally dried in a vacuum oven at 100° C. There is thus obtained 1.0 part (77.5% of theory) of poly-5-methylene-nonamethyleneadipamide as a slightly yellow solid melting at 165–169° C.

Another sample of this polyamide (of inherent viscosity 0.42 in m-cresol at a concentration of 0.5 g. of polyamide per 100 cc. of solution at 25° C.) when heated at its melting point for a period of five minutes becomes insoluble in boiling phenol. This result indicates probable crosslinking of the polyamide through its extralinearly active centers, i. e., the extralinear methylene groups, and serves to indicate the difficulties inherent in preparing linear polyamides from such diamines by conventional high temperature, polyamide-forming reactions.

EXAMPLE III

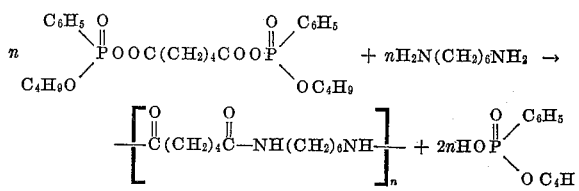

To 5.39 parts of the mixed anhydride of adipic acid and the mono-n-butyl ester of benzenephosphonic acid is added 1.16 parts (an equimolar proportion based on the anhydride) of hexamethylenediamine in about 30 parts of 10% aqueous sodium carbonate solution and the mixture vigorously shaken at once. A slight exothermic reaction occurs in the heterogeneous dispersion with the formation of a white precipitate. The mixture is shaken mechanically for five hours at room temperature and the white precipitate formed during the reaction period removed by filtration, washed with distilled water, and finally dried in a vacuum oven at 100° C. There is thus obtained 1.39 parts (62% of theory) of polyhexamethyleneadipamide as a white solid, melting at 240–247° C. and exhibiting an inherent viscosity of 0.28 in m-cresol at a concentration of 0.5 g. of polyamide per 100 cc. of solution at 25° C.

The new mixed anhydrides of carboxylic acids and monophosphonic acid monoesters of this invention can be prepared by the metathetical reaction between essentially equimolar reactive proportions of an acid halide of the requisite carboxylic acid and the silver salt of the phosphonic acid monoester being used. It is to be understood that other phosphonate salts with elements of groups I–A and I–B in the periodic table can be used in this metathetical reaction, for instance the sodium and potassium salts of the phosphonic acid monoesters can be used. Other preparative methods for these new mixed anhydrides can also be used, for instance these compounds can be prepared by the reaction between essentially equimolar reaction proportions of the ketene corresponding to the necessary carboxylic acid with the phosphonic acid monoester being used. Similarly, these new compounds can be prepared by the reaction between essentially equimolar reactive proportions of a salt of the desired carboxylic acid with an element of groups I–A, I–B, II–A, and II–B of the periodic table and the acid halide of the required phosphonic acid monoester.

As has been illustrated in Example I, part D, these new mixed anhydrides can be conveniently prepared by the reaction between essentially equimolar reactive proportions, i. e., equivalent reactive proportions on a molar basis, of the requisite carboxylic acid halide, the requisite phosphonic acid monoester, and a tertiary amine free of active (Zerewitinoff) hydrogen wherein the amino nitrogen carries only single bonds and at least one of the carbons directly attached to said nitrogen carries only single bonds. More specifically, the new mixed anhydrides of carboxylic acids and monophosphonic acid monoesters can be prepared by the reaction between the requisite carboxylic acid halide and monophosphonic acid monoester in the presence of an equivalent molar proportion, i. e., one molar proportion for each anhydride link formed, of basic tertiary amines free of (Zerewitinoff) active hydrogen which are capable of hydrohalide salt formation and wherein the nitrogen and at least one of the carbons directly attached to said nitrogen carry only single bonds. Any carboxylic acid halide free from Zerewitinoff active hydrogen can be employed to produce the mixed anhydrides of this invention including the chlorides, bromides, iodides, and fluorides, preferably the chlorides, of benzoic, toluic, terephthalic, trimesic, acetic, propionic, sebacic, alpha- and beta-hydromuconic, acrylic, cyclohexylacetic, cyclohexane carboxylic, 1,4 - cyclohexanedicarboxylic, phenylacetic, beta-phenylpropionic, p-bromophenylacetic, as well as carboxylic acids containing additional functional groups, e. g., chloroacetic, bromosuccinic, diglycolic, ketopimelic, 3 - methoxyadipic acids, and monoethyl adipate. Any monophosphonic acid monoester having phosphonic acid hydrogen as its only active (Zerewitinoff) hydrogen can be employed including, for example, monomethyl isopropanephosphonate, monoethyl p-toluenephopshonate, p-bromophenyl cyclohexanephosphonate as well as the phenyl, p-tolyl, p-bromophenyl, p-chlorophenyl esters of benzene-, p-toluene-, p-chlorobenzene-, m-cyanobenzenephosphonic acids, the benzyl, beta-phenylethyl, and beta(p-cyanophenyl)ethyl esters of phenylmethane-, beta(p-chlorophenyl)ethane-, and 2-phenylpropane-1-phosphonic acids, the monomethyl, ethyl, stearyl, allyl, and cyclohexyl esters of octadecane-, isobutane-, cyclohexane-, and propene-2-phosphonic acids. The carboxylic acid halide is reacted with the necessary monophosphonic acid monoester in the presence of an equivalent amount on a molar basis of a tertiary amine as above defined. Any such amine may be employed in the process of this invention including tertiary aliphatic amines, e. g., trimethyl, triethyl, tripropyl, tributyl, triallyl, and the like; the tertiary aliphatic/aromatic amines, e. g., N,N-dimethylaniline, N-ethyl-N-methyl-aniline, N,N-dimethyl-o-chloroaniline, N,N-dimethyl-p-toluidine, N-methyldiphenylamine; the aliphatic/alkaromatic tertiary amines, e. g., N,N-dimethylbenzylamine, N-methyl-dibenzylamine; tertiary aliphatic/cycloaliphatic amines, e. g., N,N-dimethylcyclohexylamine, N-ethyldicyclohexylamine; aliphatic/cycloaliphatic/alkaromatic tertiary amines, e. g., N-methyl-N-benzylcyclohexylamine; aliphatic/aromatic/cycloaliphatic tertiary amines, e. g., N-methyl-N-phenyl-cyclohexylamine, and the like, including broadly the tertiary amines free of active (Zerewitinoff) hydrogen wherein at least one of the valences of each amino nitrogen is satisfied by an aliphatic, cycloaliphatic, or aliphatic/aromatic radical with the carbon directly bonded to the said nitrogen carrying only single bonds and the remaining two valences of the said amino nitrogen are satisfied by aliphatic, cycloaliphatic, aliphatic/aromatic, aromatic/aliphatic, or aromatic radicals. Because of their freedom from possible undesirable side reactions and generally readier availability, it is preferred to use the teritiary amines of the types described above which, other than amino nitrogen, are solely aliphatically saturated hydrocarbon, i. e., hydrocarbon free of aliphatic unsaturation.

It is sometimes desirable to use a slight excess of the tertiary amine reactant to carry the process further to completion. Since any such excess tertiary amine must be removed from the mixed anhydride product and in any event since it is desirable to remove any unreacted tertiary amine, it is preferred to use those tertiary amines discussed above whose normal boiling point (i. e., boiling point under a pressure of 1 atm.) is no greater than 225°

C. and most preferably tertiary amines which, other than amino nitrogen, are solely hydrocarbon and free of aliphatic unsaturation whose normal boiling point is no greater than 150° C.

In the process of this invention, one mole of tertiary amine hydrohalide is formed for every anhydride link formed, on a molar basis—the hydrohalide being that of the halogen of the starting carboxylic acid halide. The tertiary amine hydrohalides so formed are readily removed from the reaction zone by simple filtration and can be regenerated by well-known methods, e. g., treatment with an aqueous solution of a strong, inorganic base followed by extraction and distillation and recycled for further use in the process. Because of the fact that the insoluble tertiary amine hydrohalide formed in the process must be removed by filtration, and as a means of rendering the process more amenable to control temperature-wise, it is generally preferred to carry out the process in an inert organic medium such as aromatic hydrocarbons, e. g., benzene, toluene; halogenated hydrocarbons, e. g., chloroform, carbon tetrachloride, chlorobenzene; ethers, e. g., diethyl, dipropyl, dibutyl ethers, dioxane, tetrahydrofuran.

Because of the lower cost for the necessary reactants as well as the greater reaction efficiency, this process is preferred for the preparation of the monoesters of the mixed carboxylic/phosphonic acid of this invention. The process can be carried out at moderate temperatures, e. g., as high as 50–75° C., but because of the relative thermal sensitivity of these new mixed anhydrides, coupled with the fact that this new process loses very little or none of its reaction efficiency at the lower temperatures, it is preferred to carry out the reaction at room temperature (25° C. or below), preferably at 0–10° C. This new process also constitutes a part of this invention.

The intermediate monophosphonic acid monoesters can be prepared in other ways than illustrated in Example I, parts A, B, and C. For instance they can be prepared (a) by the reaction of the requisite alcohol or phenol with the tetrahalophosphines or the oxydihalophosphines in the manner of Michaelis, Ann. 181, 265–363 (1876), Kosolapoff et al., J. Am. Chem. Soc., 69, 2020 (1947), and U. S. Patent 2,389,576; (b) by the reaction of equimolar quantities of the requisite alcohol or phenol and the dihalide of the phosphonic acid involved followed by hydrolysis of the haloester so formed; see Michaelis, supra; (c) by the partial oxidation of the corresponding phosphonous acid monoester as disclosed in U. S. 2,137,792; (d) by the metathetical reaction between equimolar quantities of the requisite alkali metal or alkaline earth metal alcoholate or phenolate and the dihalide of the phosphonic acid involved followed by hydrolysis of the haloester so formed; see Hatt, J. Chem. Soc. 1929, 2412–2422; (e) by the alkaline hydrolysis of the requisite phosphonic acid diester and subsequent acidification; see Nylen, Ber. 59B, 1119–1128 (1936).

These new mixed anhydrides of carboxylic acids and phosphonic acid monoesters, as has been pointed out previously, have the general structure

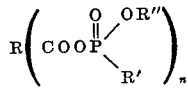

wherein R is an organic radical free of Zerewitinoff active hydrogen of valence $n$, $n$ is an integer from 1 to 4 and R' and R" are monovalent organic radicals free from Zerewitinoff active hydrogen, R, R', and R" are preferably solely hydrocarbon. The general formula reduces to

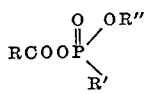

in the case of the monobasic carboxylic acids and

in the case of the dicarboxylic acids R, R', and R" can be aliphatic and cycloaliphatic including both saturated and unsaturated, aromatic, araliphatic, alkaromatic, cycloaliphatic, and heterocyclic radicals free of Zerewitinoff active hydrogen. These various radicals can contain functional substituents such as ether, carboxyester, ketone, sulfide, disulfide, tertiary amine groups as well as heterocatenic atoms such as oxygen, nitrogen, or sulfur. As mentioned previously, the new mixed carboxylic/phosphonic acid anhydrides wherein the various R groups outlined above are solely hydrocarbon, and particularly those which are aliphatically saturated hydrocarbon, i. e., hydrocarbon free of aliphatic unsaturation, are preferred because of their readier preparation and greater efficiency in carboxamide- and carboxyester-forming reactions with, respectively, the amino hydrogen containing amines and the alcohols. Because of the greater availability of the necessary intermediates those new mixed anhydrides are preferred wherein the various R's are solely aliphatically saturated hydrocarbon radicals no greater in chain length than 18 and preferably 6 carbons. A particularly valuable class of these new mixed anhydrides because of the ready availability of the necessary intermediates and the utility of the compounds in forming polyamides and polyesters are the mixed anhydrides of the hydrocarbon dicarboxylic acids free of aliphatic unsaturation, preferably the polymethylene dicarboxylic acids of no more than 8 carbons, with the monolower saturated alkyl (of no more than 6 carbons) hydrocarbon esters of the monophosphonic acids which other than the phosphonic acid group are solely hydrocarbon free of aliphatic unsaturation, e. g., the arylphosphonic acids. Most preferably these acids are of no more than 6 carbons, e. g., the monolower saturated hydrocarbon esters of benzenephosphonic acid.

The invention is thus generic to the mixed anhydrides of aliphatic carboxylic acids and aliphatic monoesters of aliphatic phosphonic acids, the mixed anhydrides of aromatic and alkaromatic carboxylic acids with the aromatic and alkaromatic monoesters of aromatic or alkaromatic phosphonic acids, and the mixed anhydrides of araliphatic carboxylic acids with araliphatic esters of araliphatic phosphonic acids. The invention is of course inclusive of such mixed derivatives as the mixed anhydrides of: aliphatic carboxylic acids with the araliphatic monoesters of aromatic phosphonic acids, aromatic carboxylic acids with aromatic monoesters of araliphatic phosphonic acids, alkaromatic carboxylic acids with aliphatic monoesters of aromatic phosphonic acids, araliphatic carboxylic acids with cycloaliphatic monoesters of alkaromatic phosphonic acids, etc.

The new mixed anhydrides of carboxylic acids and phosphonic acid monoesters of the present invention are of particular utility in the formation of carboxylic acid esters and carboxamides by reaction respectively with alcohols and amino hydrogen containing amines in essentially equivalent reactive proportions. The alcohols, which can be used in conjunction with these new mixed anhydrides to form the esters of the alcohol with the carboxylic acid fragment of the mixed anhydrides, include the monoalcohols, the glycols, and the higher polyalcohols. For the formation of esters it is highly desirable that the alcohol should be free of Zerewitinoff active hydrogen other than the alcoholic hydrogens. In the case of the glycols and the higher polyalcohols, polyesters are formed. The mixed anhydrides of the polycarboxylic acids with the polyalcohols give high molecular weight polyesters, which in the case of the glycols and the neutral mixed anhydrides of the dicarboxylic acids are linear. The glycols which can be used in preparing the polyesters by reaction with these new mixed anhydrides are those previously described for polyester formation, e. g., in U. S. 2,071,250, 2,071,251, e. g. ethylene, trimethylene, hexamethylene, decamethylene glycols, etc.

Similarly, these new mixed anhydrides are of particular utility in the formation of carboxamides by reaction with the amino hydrogen containing amines. In the case of the diamines and the higher polyamines having at least one hydrogen on each amino nitrogen polyamides are formed. The mixed anhydrides of the polycarboxylic acids give, with the polyamines, high molecular weight polycarboxamides, which in the case of the diamines and the neutral mixed anhydrides of the dicarboxylic acids are linear. These new mixed anhydrides are of particular utility in the preparation of the linear polyesters and polyamides because of the relatively low temperatures at which these reactions can be effected. These lower temperatures enable the desirable extrafunctionally substituted glycols and diamines to be used. Examples of the particular diamines which can be used with these new neutral mixed anhydrides of the dicarboxylic acids to form the linear polycarboxamides are those previously disclosed for polyamide formation, e. g., in U. S. 2,130,948, such as ethylene, tetramethylene, pentamethylene, hexamethylene, octamethylene, decamethylene diamines, piperazine, 3-methylhexamethylene diamine, etc. The new mixed anhydrides of the present invention react more rapidly with the amino hydrogen containing amines than with the alcohols, i. e., the carboxamide-forming reaction proceeds more rapidly than does the carboxyester-forming reaction.

Mixtures of the alcohols and amino hydrogen containing amines can, of course, be used, in which case the products are mixed ester amides with the amide links usually being formed much faster. In the case of mixtures of the polyalcohols and polyamines with the mixed anhydrides of the polycarboxylic acids, the products are mixed polyesteramides, which are linear in the case of the mixtures of glycols and diamines containing two amino hydrogen containing amine groups with the neutral mixed anhydrides of dicarboxylic acids. Suitable mixtures of the glycols and diamines and descriptions of the mixed linear polyester amides produced will be found in U. S. 2,224,037.

Mixed ester amides can also be produced by reaction between the mixed anhydrides of this invention and amino alcohols containing hydrogen or amino nitrogen. In the case of the mixed anhydrides of the polycarboxylic acids the amino alcohols give mixed polyester amides which in the case of the neutral mixed anhydrides of dicarboxylic acids and monoamino monoalcohols are linear. Suitable amino alcohols, particularly for producing the linear mixed polyesteramides will be found in U. S. 2,312,879.

The mixed anhydrides of the present invention, particularly those from monocarboxylic acids, can be used in general biosynthetic work, e. g., in the formation of peptides by reaction with the requisite amino acids or preferably the amino acid esters.

These carboxyester and carboxamide forming reactions are normally carried out at temperatures in the range 0–100° C., although slightly lower temperatures, e. g., of the order −5 to −10° C., can sometimes be used. Temperatures appreciably higher than 100° C., e. g., of the order 125–150° C., are to be avoided because of the relatively high thermal decomposition rate of these mixed anhydrides.

These ester and amide forming reactions can be carried out in organic solution using organic solvents which are unreactive with either the mixed anhydrides or the alcohols or amines being used. Typical examples of such organic solvents include the halogenated hydrocarbons, e. g., chloroform, carbon tetrachloride, tetrachloroethane, chlorobenzene, and the like; the aromatic hydrocarbons, e. g., benzene, toluene, the xylenes and the like; the ethers, e. g., diethyl ether, dioxane, tetrahydrofuran and the like; liquid tertiary amines, e. g., triethylamine. Thus, these organic solvents may be generally classified as those normally liquid at room temperature which are free from Zerewitinoff active hydrogen and which preferably do not have a normal boiling point above 100° C.

These ester and amide forming reactions can also be carried out in aqueous media at temperatures again within the range −5 to 100° C., preferably from 0 to 50° C. Since these new mixed anhydrides of carboxylic acids and phosphonic acid monoesters are normally water insoluble, the ester and amide forming reactions in aqueous media are normally aqueous, heterogeneous dispersion, condensation reactions. In the case of the reaction of the mixed anhydrides of dicarboxylic acids with glycols or with amines containing two amino hydrogen containing amine groups, the aqueous heterogeneous dispersion reactions are particularly useful. The products from these reactions are aqueous dispersions of the polyesters and polyamides except in the case of those polyesters which are highly water sensitive, when the products are partially dispersions and partially solutions of the polyesters involved. These aqueous heterogeneous dispersions of the polyesters and polyamides are of varying degrees of dispersion stability, depending on the nature of the molecular structure of the polyamides and polyesters. The stability of these aqueous heterogeneous dispersions can be appreciably improved by adding to the aqueous polycondensation system any of the commercially available detergents and dispersing agents.

The ester and amide forming reactions, whether in organic or aqueous media, are normally carried out for periods of from one to four hours. Longer reaction times may be used, although no advantage is gained thereby. As is true with most organic reactions and particularly in the case of the polyester and polyamide forming reactions, there is no upper limit to the time within which any one given reaction can be carried out. However, reasonable cost and operating requirements, particularly since no apparent advantage is gained by longer reaction times, result in the process usually being carried out for no longer than two hours.

In these ester and amide forming reactions a mole of by-product phosphonic acid monoester is formed for every mixed anhydride functionality which reacts with an alcoholic or amino hydrogen. For example, the reaction of ethylamine with an essentially equimolar reactive proportion of the mixed anhydride of propionic acid with ethyl n-butanephosphonate leads to the formation of one mole of n-ethylpropionamide and one mole of ethyl n-butanephosphonate, i. e., the monoethyl ester of n-butanephosphonic acid. Similarly, the reaction between essentially equimolar reactive proportions of N,N'-diisobutylhexamethylenediamine and the mixed anhydride of terephthalic acid and the monophenyl ester of methanephosphonic acid results in the formation of poly N,N'-diisobutylhexamethyleneterephthalamide and two molar proportions of the monophenyl ester of methanephosphonic acid. With the higher polyalcohols and polyamines a similarly increasing molar yield of the by-product phosphonic acid monoesters is obtained. These by-product phosphonic acid monoesters are relatively strongly acidic and therefore capable of reaction with the alcohol or amino hydrogen containing amine being used. Accordingly, it is desirable in order to facilitate the formation of the desired carboxylic acid ester or carboxamide that these by-product phosphonic acid monoesters be removed from the reaction zone as soon as they are formed.

A convenient method of carrying out this neutralization is simply to have present in the reaction zone sufficient base to react with the by-product phosphonic acid monoesters. Organic bases may be used and in fact are the preferred type for use in organic media. To avoid complications in the ester and amide forming reactions it is preferred not to use any Zerewitinoff active hydrogen containing, organic bases, particularly the amino hydrogen containing amines.

In aqueous media these by-product phosphonic acid monoesters are most conveniently removed through salt formation with added inorganic bases, preferably the strongly basic salts and hydroxides of the alkali forming metals, i. e., the alkali metals and alkaline earth metals. These aqueous heterogeneous ester and amide forming dispersion reactions can be carried out in the presence of an aqueous buffer which of course serves to neutralize the acidic by-product esters formed. These aqueous dispersion condensations may be acidic, basic, or neutral, but as has been pointed out before best results are obtained when the dispersion system is basic, i. e., pH from 7.1 to 14.0. In such systems the by-product phosphonic acid esters are rapidly neutralized and the resultant metal salts of the phosphonic acid monoesters, being readily water soluble, remain in the aqueous phase and are thus removed from the product. Suitable aqueous buffer systems which can be used include the alkali metal and alkaline earth metal salts of acetic, boric, carbonic (including both the bicarbonate and carbonate salts), phosphoric (including both the monohydrogen and dihydrogen acid salts) acids, and the like. Best results in these aqueous dispersion systems have been obtained with aqueous solutions of the alkali metal and alkaline earth metal hydroxides, particularly with the strongest bases, i. e., in systems ranging in pH from 12.0 to 14.0.

It has already been pointed out that essentially equimolar reactive proportions of the alcohols or amino hydrogen containing amines and the new mixed anhydrides of carboxylic acids and phosphonic acid monoesters are preferably used in the ester and amide forming reactions. Variations in these proportionalities are within the scope of the present invention. However, from the cost standpoint large excesses of either reactant are to be avoided.

In the claims the term "acyl radical of monobutyl benzenephosphonate" and like terms are employed, in accordance with approved chemical terminology (Webster, page 28; Hackh 3d, page 18) to designate the non-hydroxyl portion of the organic phosphonic acid.

The foregoing detailed description has been given for clearness of understanding only and no unnecessary limitations are to be understood therefrom. The invention is not limited to the exact details shown and described for obvious modifications will occur to those skilled in the art.

What is claimed is:

1. The anhydride of an organic carboxylic acid wherein each carboxyl is anhydridized with a monoester of an organic monophosphonic acid, said anhydride being free of active hydrogen.

2. The anhydride of an aliphatic carboxylic acid wherein each carboxyl hydrogen is replaced by the acyl radical of a monoester of an organic monophosphonic acid, said anhydride being free of active hydrogen.

3. The anhydride of a saturated aliphatic carboxylic acid wherein each carboxyl hydrogen is replaced by the acyl radical of a monoester of an organic monophosphonic acid, said anhydride being free of active hydrogen.

4. The anhydride of a polymethylene dicarboxylic acid wherein each carboxyl hydrogen is replaced by the acyl radical of a monoester of an organic monophosphonic acid, said anhydride being free of active hydrogen.

5. The anhydride of a saturated aliphatic carboxylic acid, hydrocarbon except for carboxyl, wherein each carboxyl hydrogen is replaced by the acyl radical of an alkyl monoester of an organic monophosphonic acid, said anhydride being free of active hydrogen.

6. The anhydride of a polymethylene dicarboxylic acid wherein each carboxyl hydrogen is replaced by the acyl radical of an alkyl monoester of an arylmonophosphonic acid, said anhydride being free of active hydrogen.

7. The anhydride of adipic acid wherein each carboxyl hydrogen is replaced by the acyl radical of an alkyl monoester of an arylmonophosphonic acid, said anhydride being free of active hydrogen.

8. The anhydride of adipic acid wherein each carboxyl hydrogen is replaced by the acyl radical of monobutyl benzenephosphonate.

9. A process for the preparation of a mixed anhydride in which process a carboxylic acid halide free from Zerewitinoff active hydrogen is reacted with a monoester of an organic monophosphonic acid having phosphonic acid hydrogen as its only active hydrogen at 0–25° C. in the presence of a tertiary amine free from active (Zerewitinoff) hydrogen wherein each tertiary amino nitrogen and at least one of the carbons bonded directly thereto carry only single bonds.

10. The anhydride of an organic carboxylic acid wherein each carboxyl is anhydridized with a monoester of an organic monophosphonic acid, said anhydride being free of active hydrogen and being hydrocarbon except for carboxyl oxygen and phosphonic oxygen and phosphorus.

11. The anhydride of an aliphatic carboxylic acid wherein each carboxyl hydrogen is replaced by the acyl radical of a monoester of an organic monophosphonic acid, said anhydride being free of active hydrogen and being hydrocarbon except for carboxyl oxygen and phosphonic oxygen and phosphorus.

12. The anhydride of a saturated aliphatic carboxylic acid wherein each carboxyl hydrogen is replaced by the acyl radical of a monoester of an organic monophosphonic acid, said anhydride being free of active hydrogen and being hydrocarbon except for carboxyl oxygen and phosphonic oxygen and phosphorus.

References Cited in the file of this patent

UNITED STATES PATENTS

| Number | Name | Date |
|---|---|---|
| 2,223,916 | Martin | Dec. 3, 1940 |
| 2,228,653 | Denison et al. | Jan. 14, 1941 |
| 2,373,627 | Dietrich | Apr. 10, 1945 |
| 2,434,357 | Fischer | Jan. 13, 1948 |
| 2,486,658 | Kosolapoff | Nov. 1, 1949 |
| 2,558,031 | Allen et al. | June 26, 1951 |
| 2,625,536 | Kirby | Jan. 13, 1953 |

OTHER REFERENCES

Bentley: J. Am. Chem. Soc., 70, 2183–5 (1948).